Patented Mar. 4, 1947

2,416,874

UNITED STATES PATENT OFFICE 2,416,874

TREATMENT OF INTERPOLYMERS OF VINYL CHLORIDE AND ESTERS OF ETHYLENEDI-CARBOXYLIC ACIDS

Benjamin Wilson Howk and Henry John Richter, Wilmington, Del., assignors to E. I. du Pont de Nemours & Company, Wilmington, Del., a corporation of Delaware No Drawing. Application August 20, 1943, Serial No. 499,380

2 Claims. (Cl. 260—78)

This invention relates to the interpolymers of ethylenedicarboxylic acid esters with vinyl chloride. More specifically, it relates to a process for curing these polymers and to the products obtained therefrom.

The uses to which the fumaric ester/vinyl chloride and maleic ester/vinyl chloride interpolymers can be put are somewhat limited by the low softening point and sensitivity to organic solvents of these polymers and these properties of the polymers preclude the use thereof for some applications. In other instances these properties are distinctly disadvantageous.

This invention has therefore as an object the provision of a process for raising the softening point of these interpolymers. Another object is a decrease in the sensitivity of these polymers towards organic solvents. Other objects will appear hereinafter.

These objects are accomplished by the following invention wherein an interpolymer of vinyl chloride with an ester of an ethylenedicarboxylic acid is cured by compounding the same with sulfur, a rubber accelerator, and a Group II metal oxide and heating for at least 15 minutes at a temperature of at least 100° C.

The term "curing" as used herein means that changes are produced in the polymer which result in improved properties, particularly in the increase in solvent resistance and increase in temperature at which the material becomes tacky. While the results of curing are similar to the results obtained in vulcanizing rubber, the chemical reactions involved are not similar since, in contradistinction to rubber, the polymers of fumaric esters and vinyl chloride are essentially free from unsaturation.

Generally, the curing process is conducted by first thoroughly mixing the polymeric materials and the desired amount of the compounding ingredients on heated mill rolls by methods well known in the art. The roll temperatures may vary between 60 and 140° C., depending among other things on the amount of plasticizer, if one is used, and on the particular polymer employed. The milled product is then cured by heating at a temperature of at least 100° C. for at least 15 minutes. Shaped articles can be prepared if desired by molding and curing the product under pressure.

The more detailed practice of the invention is illustrated by the following examples, wherein parts given are by weight. There are, of course, many forms of the invention other than these specific embodiments.

*Example I*

A mixture comprising 12 parts of an interpolymer of vinyl chloride (95%) and diethyl fumarate (5%), 6 parts of methoxyethyl acetylricinoleate, 3 parts of carbon black, 0.25 part of sulfur, 0.125 part of 2-mercaptothiazoline, and 1.25 parts of zinc oxide is milled into a homogeneous mass on standard rolls at a temperature of 80–100° C. The compounded materials are then cured in a mold by heating for 50 minutes at 150° C. under 7000 lbs. initial pressure. The cured product is tough and pliable, is only slightly swelled by common organic solvents and is not tacky at temperatures as high as 240° C. It has a tensile strength of 3150 lb./sq. in. and an elongation at break of 260%.

*Example II*

A mixture containing 12 parts of vinyl chloride/diethyl fumarate (95/5) and 6 parts of di-(butoxyethyl) sebacate is blended by milling on hot rolls (100–110° C.). To the hot working bank is added 0.96 part of dipentamethylenethiuram tetrasulfide, 0.8 part of zinc oxide and 3 parts of carbon black. The compounded stock is then stripped, cooled, and vulcanized under 7000 lb. pressure at 150° C. for 15 minutes. The resultant cured product has a tensile strength of 2300 lb./sq. in. at 220% break elongation. It is strong, tough and elastic and resistant to such solvents as methyl ethyl ketone/xylene mixtures. Improved resistance to heat is shown by the fact that the tack temperature of the cured stock is 254° C., as compared to a tack temperature of 100° C. for corresponding uncured material.

In this example, the sulfur is supplied by the accelerator itself, which liberates sulfur under the vulcanizing conditions used. If desired, however, additional free sulfur can be added. For example, a mixture of 12 parts of the same interpolymer, 4.8 parts of di(butoxyethyl) sebacate, 0.18 part of carbon black, 0.12 part of dipentamethylenethiuram tetrasulfide, 0.12 part of sulfur and 0.6 part of zinc oxide gives a product having excellent solvent resistance and a tack temperature of 160° C. when cured 30 minutes at 150° C.

*Example III*

After working a mixture of 12 parts of vinyl chloride/diethyl fumarate (95/5) interpolymer and 4.8 parts of di(butoxyethyl) sebacate until homogeneous on rubber rolls at 80–110° C., the following ingredients are compounded in the order named: 0.18 part carbon black, 0.12 part of sulfur, 0.1 part of hexamethyleneammonium hexamethylenedithiocarbamate and 0.6 part of zinc oxide. The cured product (30 minutes at 150° C.) has good solvent resistance and a high tack temperature of 220° C. It possesses a tensile strength of 2000 lb./sq. in. at 94% break elongation.

*Example IV*

Twelve parts of a vinyl chloride/diethyl fumarate interpolymer (95/5) is plasticized with 4.8 parts of di(butoxyethyl) sebacate by blending on standard rolls at 100–110° C. To this blend is added 0.18 part of carbon black, 0.12 part of sulfur, 0.12 part of diphenylguanidine and 0.6 part of zinc oxide. The resultant compounded stock, cured for 15 minutes at 150° C., has a tensile strength of 2400 lb./sq. in. at 100% break elongation.

*Example V*

A composition comprising 96 parts of a dimethyl maleate/vinyl chloride interpolymer (5/95) having a viscosity of 2.75 poises in 10% cyclohexanone solution, 48 parts of di(butoxyethyl) sebacate, 2 parts of "Gastex" (commercial grade of carbon black), 2 parts of sulfur, 1 part of 2-mercaptothiazoline and 10 parts of zinc oxide is rubber milled until homogeneous on a rubber mill at 80–100° C., then cured for 50 minutes at 150° C. under an initial pressure of 7000–10,000 lbs./sq. in. The cured stock has a tensile strength at break of 2170 lbs./sq. in. and an elongation at break of 200%. A composition comprising only the same interpolymer (96 parts) and the same plasticizer (48 parts) shows, after a similar heat treatment, a tensile strength at break of 1700 lb./sq. in. and an elongation at break of 300%.

Instead of a 5/95 dimethyl maleate/vinyl chloride interpolymer, there may be used a composition comprising 96 parts of a 10/90 dimethyl maleate/vinyl chloride interpolymer, the other ingredients being the same as above and in the same proportions. After curing for 50 minutes at 150° C., the stock has an elongation at break of 150% and is substantially unaffected by the common organic solvents.

The invention has been illustrated with particular reference to interpolymers containing 90% by weight or more of vinyl chloride. However, interpolymers of any desired composition may be used, though it is in general desirable that the interpolymer contain at least 10% of chlorine, i. e., at least 18% of vinyl chloride based on the weight of the total polymer. Preferably, the interpolymer contains at least 50% by weight of vinyl chloride and the best results are obtained when the proportion of vinyl chloride is at least 75% by weight.

Other esters of the ethylenedicarboxylic acids may be used in addition to those shown in the examples, such as the dipropyl, diisopropyl, dibutyl, di-sec. butyl, diisobutyl, dihexyl, dicyclohexyl, didecyl, didodecyl, etc. Preferably, the esters of maleic and fumaric acids with aliphatic alcohols of up to six carbon atoms especially a lower alkanol are used since they are cheaper and more easily accessible.

It has been found that the combination of sulfur, a rubber vulcanization accelerator and a group II metal oxide is ideally suitable for optimum curing. As shown in Example II, the sulfur may be furnished by the accelerator itself, when the latter is of a type which liberates sulfur under the conditions of cure, e. g., an accelerator of the thiuram tetrasulfide type. Oxides of metals of group II of the periodic system, e. g., magnesium oxide, can be used alone, but the products so obtained do not possess to the same degree the outstanding tensile strength, elongation and solvent resistance characteristic of the products cured with the preferred combination. Better cures are obtained by using sulfur or a rubber vulcanization accelerator in combination with the group II metal oxide. However, high solvent resistance, good elongation and good tensile strength are obtained only when all three ingredients are used together (it being understood always that the sulfur need not be added independently, i. e., as free elemental sulfur, but can be produced by the rubber accelerator itself when the latter is of a suitable type).

The amount of the various curing ingredients may be varied rather widely. There may be used as low as 0.25% and as high as 10% of sulfur. However, in general, it is desirable to avoid excessive amounts of sulfur, the use of which results in the formation of sulfur bloom. The preferred amount of sulfur has been found to be about 1% based on the weight of the polymer. It is in general undesirable to use more than 5% by weight of the rubber vulcanization accelerator since, at higher levels, the compounded stocks cure poorly and thus possess low tack temperature and poor solvent resistance. The preferred range of accelerator is between 0.25 and 5% based on the weight of the interpolymer. The amount of group II metal oxide may be varied between 0.5 and 10% based on the weight of the interpolymer, the preferred range being 3 to 5%.

Any group II metal oxide may be used with success, such as, for example, magnesium oxide, calcium oxide, strontium oxide, barium oxide, or mercuric oxide, but the preferred one is zinc oxide. It has also been found possible to use lead oxide. Any rubber vulcanization accelerator may be used, including, in addition to those already mentioned, piperidinium pentamethylenedithiocarbamate, hexamethyleneammonium hexamethylenedithiocarbamate, the zinc salts of mercaptobenzothiazole activated with di-orthotolyl-guanidine, etc. The thiuram tetrasulfide accelerators, which are represented by the general formula

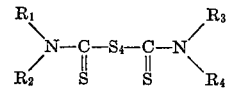

wherein the R's are hydrocarbon radicals which may be alike or different (two radicals attached to a common nitrogen atom may be joined together to form a single cyclic divalent radical as in the dipentamethylenethiuram tetrasulfide of Example II), are worthy of special note since they may be used in the absence of sulfur, sulfur being liberated by these accelerators under the curing conditions. Examples of these thiuram tetrasulfide accelerators are di(phenylethyl)thiuram tetrasulfide, tetraethylthiuram tetrasulfide, tetrabutylthiuram tetrasulfide, etc.

Various reinforcers and fillers may be incorporated into the polymer at any stage during the process, such, for example, as carbon black, clay, calcium carbonate, starch, etc. Pigments may also be added.

The curing process may be carried out in accordance to variations well known in the art, such as in a mold, press, or in the absence of external pressure as, for example, in the preparation of spongy articles where a blowing agent is employed. In general, temperatures of 130 to 150° C. are employed for periods of 50 to 60 minutes.

As plasticizers, there may be employed any substances or combinations of substances which are known to have a plasticizing action for the interpolymers. Examples are dibutyl phthalate, acetylated castor oil, tricresyl phosphate, etc. These plasticizers may be employed in amounts varying from 0 to 150% or higher of the weight of the polymer used, with corresponding variations in the properties of the cured stock from hard and brittle substances resembling hard rubber to soft and pliable compositions. In general, the preferred range of plasticizer is 30 to 100% of the weight of the polymer. It may be added directly to the polymer as the first step in the milling operation or it may be premixed with the polymer by forming a slurry of the two ingredients in a suitable solvent and allowing the solvent to evaporate.

The products of this invention vary from soft, elastic materials to hard, horny substances resembling hard rubber. Since they can be prepared in any desired shape by molding, they are useful in numerous fields where their pliability, solvent resistance, non-thermoplasticity make them applicable. Among the uses for the pliable compositions are bathing apparel (belts, caps, capes, etc.), dental goods, such as dental dams, drugs, and surgical supplies, (sheeting, tubing, teething rings, nipples, ice bags, etc.), flooring (floor mats, stair treads, etc.), footwear (rubbers, heels, taps, impregnated soles, etc.), household items (jar rings, bottle caps, buttons, coasters, fly swatters, wedges, sink stoppers, aprons, gloves, kneeling pads, ash trays, mats, etc.), insulated wire and cable, laboratory supplies (tubing, stoppers, aprons, etc.), latex products (can closures, jar rings, etc.), mechanical goods (belting, hose, mountings, gaskets, valve discs, rolls, washers, grommets, auto mats, pedal rubbers, tires for toys, tank linings, windshield wipers, etc.), proofed goods (auto fabrics, crib sheets, shower curtains, raincoats, etc.), sponge rubber products (arm rests, cushions, sponges, mats, toys, etc.), sporting goods (balls, surf toys, baseball plates, etc.), stationers' goods (typewriter feet, telephone bases, coin mats, cord protectors, etc.), threads, toys and novelties (dolls, molded toys, balls, dog toys, sponge novelties, etc.), vehicle accessories (top dressing, pedal pads, tires, etc.). The hard rubber-like products are useful as binders for paint brush bristles, battery cases, insulators and the like.

The above description and examples are intended to be illustrative only. Any modification of or variation therefrom which conforms to the spirit of the invention is intended to be included within the scope of the claims.

What is claimed is:

1. Process for preparing a vulcanized insoluble interpolymer of 95% vinyl chloride with 5% diethyl fumarate which comprises heating said interpolymer for 50 to 60 minutes at a temperature of 130° C. to 150° C. with from 0.25 to 10% sulfur, from 3% to 5% zinc oxide, and 0.25% to 5% mercaptobenzothiazole, all based on the weight of the interpolymer.

2. An improved interpolymer obtained by the process of claim 1.

BENJAMIN WILSON HOWK.
HENRY JOHN RICHTER.

REFERENCES CITED

The following references are of record in the file of this patent:

UNITED STATES PATENTS

| Number | Name | Date |
|---|---|---|
| 1,989,246 | Reed | Jan. 29, 1935 |
| 2,115,896 | Wiezevich | May 3, 1938 |
| 2,245,500 | Rein et al. | June 10, 1941 |
| 2,274,616 | Raynolds | Feb. 24, 1942 |
| 2,175,049 | Alexander | Oct. 3, 1939 |

FOREIGN PATENTS

| Number | Country | Date |
|---|---|---|
| 353,194 | British | July 23, 1931 |
| 476,727 | British | Dec. 14, 1937 |

OTHER REFERENCES

Brous et al., article in Ind. Eng. Chem., June 1935, pages 667–672. 260–36.